United States Patent
Ledet

(10) Patent No.: US 10,999,337 B1
(45) Date of Patent: *May 4, 2021

(54) USER DEVICE INTERACTIONS DURING A SESSION OF A CO-BROWSING ENVIRONMENT

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,939

(22) Filed: Aug. 13, 2019

Related U.S. Application Data

(63) Continuation of application No. 15/380,806, filed on Dec. 15, 2016, now Pat. No. 10,382,507.

(51) Int. Cl.
*G06F 15/16* (2006.01)
*H04L 29/06* (2006.01)

(52) U.S. Cl.
CPC ...... *H04L 65/4053* (2013.01); *H04L 65/1069* (2013.01)

(58) Field of Classification Search
CPC .................. H04L 65/4053; H04L 65/1069
USPC ...................................................... 709/205
See application file for complete search history.

(56) References Cited

U.S. PATENT DOCUMENTS

| | | | |
|---|---|---|---|
| 7,162,025 B2* | 1/2007 | Schnurr | H04M 1/72552 379/355.07 |
| 7,444,379 B2* | 10/2008 | Becker | G06Q 10/107 709/206 |
| 7,512,117 B2 | 3/2009 | Swartz | |
| 7,984,113 B2 | 7/2011 | Steinwagner | |
| 8,265,672 B1* | 9/2012 | Osinga | H04W 4/21 455/466 |
| 8,380,855 B2 | 2/2013 | Bryce et al. | |
| 8,799,065 B2 | 8/2014 | Reuthe et al. | |
| 8,831,209 B2* | 9/2014 | Schnurr | H04M 1/72552 379/355.07 |
| 8,914,734 B2 | 12/2014 | Narayanaswamy | |
| 8,929,522 B2 | 1/2015 | Berk | |
| 8,929,932 B1* | 1/2015 | Lan | H04W 4/14 455/466 |
| 9,098,832 B1 | 8/2015 | Scardino | |
| 9,137,360 B2* | 9/2015 | Rosenshine | H04M 7/003 |
| 9,736,213 B2 | 8/2017 | Mendez et al. | |
| 10,218,666 B1* | 2/2019 | Rosenshine | G06Q 10/107 |
| 10,306,000 B1* | 5/2019 | Isacks | H04M 7/127 |
| 10,382,507 B1* | 8/2019 | Ledet | G06F 15/00 |
| 2003/0053444 A1 | 3/2003 | Swartz | |

(Continued)

*Primary Examiner* — Moustafa M Meky

(57) ABSTRACT

Co-browsing may offer support and other features to consumers of various websites and other online tools and applications. One example embodiment may include receiving a browsing session notification from a user device, identifying a request message destined for another user device, intercepting the request message, identifying the request message as requesting a multi-user session, forwarding the request message to the another user device, identifying a group to assign to the user device and the another user device based on activity performed by the user device, and assigning the user device and the another user device to the group and creating the multi-user session.

20 Claims, 13 Drawing Sheets

(56) References Cited

U.S. PATENT DOCUMENTS

| | | |
|---|---|---|
| 2007/0121909 A1* | 5/2007 | Schnurr ................. H04L 12/66 |
| | | 379/355.01 |
| 2008/0140674 A1 | 6/2008 | Ishikawa |
| 2009/0016510 A1* | 1/2009 | Becker ................. G06Q 10/107 |
| | | 379/142.15 |
| 2010/0250756 A1 | 9/2010 | Morris |
| 2011/0154204 A1 | 6/2011 | Narayanaswamy |
| 2012/0272133 A1 | 10/2012 | Carroll et al. |
| 2012/0275349 A1 | 11/2012 | Boyer et al. |
| 2014/0226537 A1 | 8/2014 | Kashimba et al. |
| 2014/0337316 A1 | 11/2014 | Abuelsaad et al. |
| 2015/0100501 A1 | 4/2015 | Young |
| 2016/0005075 A1* | 1/2016 | Rosenshine ........ G06Q 30/0255 |
| | | 705/14.53 |
| 2017/0054772 A1 | 2/2017 | Isaacs |
| 2017/0111457 A1 | 4/2017 | Rivera |
| 2019/0230172 A1* | 7/2019 | Isacks ................. H04L 65/1069 |

* cited by examiner

| Global Environment | | |
|---|---|---|
| Type | Element | Description |
| | Indoor Mall | Dual sided storefronts (hallway). Different layouts supported (Star, Ladder, Square, Plus sign). |
| | Outdoor Mall | Single sided storefronts. Different Layouts (Rectangle, Line, L-Shape) |
| | Flea Market – Lattice | Outdoor feel. |
| | Department Store | Rectangle, Multi-floor. Indoor feel. |
| | Single Store | Indoor feel. |
| | Dealership | Showroom (Indoor), Lot (Outdoor), Both, New Item Section, Used Item Section. |
| | Carnival | Festive Outdoor feel. |
| Population Density | Element | Description |
| | NNN | Sets the number of people/groups that will be simultaneously included in the session. |
| Group Behavior | Element | Description |
| | Group Size | Minimal and Maximum size of groups |
| | Group Behavior | What the group may or may not do |
| | Multiple Group Settings | How many groups can a user be in at one time |

FIG. 3

| Selling Environment | | |
|---|---|---|
| Type | Element | Description |
| | Store | A typical store |
| | Movie Theater | A theater type of business |
| | Environment Map | A kiosk located in a mall environment for finding the store locations |
| | Radio Station | A radio station type of business |
| | News Outlet | A news organization |
| | Advertising Space | Advertising |
| | Open Air Store in hall | A store located in a mall type environment |
| | Kiosk | An advertising or POS element |
| | Store Specials – Audio | Specials pertaining to a particular store |
| | Store Specials – Visual (flyer/paper) | Specials pertaining to a particular store |
| | Mall Specials – Audio | Specials pertaining to a group of stores |
| | Mall Specials – Visual (flyer/paper) | Specials pertaining to a group of stores |
| | Breaking News | Information elements pertaining to news |
| | Auction House | A organization pertaining to auctions |
| Sales Person Behavior | Element | Description |
| | Initiate Conversation | The sales person may begin the conversation |
| | Silent until asked for | The sales person may only interact when questioned |
| | Multiple Sales People | More than one sales person is available |
| | Join with experts capability | Technical, negotiators, help desk, etc. |

FIG. 4

| SubSection Equipment | | |
|---|---|---|
| Type | Element | Description |
| | Book | Book products |
| | Clothing | Men, Women, Boy, Girl, Infant |
| | Sporting Goods | Sporting department |
| | Kids Toys | Kids toys department |
| | Food | Products related to food |
| | Jewelry | Jewelry department |
| | Musical Instruments | Musical department |
| | Accessories | A division of a department |

FIG. 5

| Global Environment | | |
|---|---|---|
| Type | Element | Description |
| | Global Organization | The complete global organization |
| | Country Division | The organization's location per country |
| | Vendors | Vendors associated with the organization |
| | Products | Products output from the organization |
| Population Density | Element | Description |
| | NNN | Sets the number of people/groups that will be simultaneously included in the session |
| Group Behavior | Element | Description |
| | Group Size | Minimal and Maximum size of groups |
| | Group Behavior | What the group may or may not do |
| | Multiple Group Settings | How many groups can a user be in at one time |

FIG. 6

| Section Environment | | |
|---|---|---|
| Type | Element | Description |
| | HR | Human Resource Organization Element |
| | Marketing | Marketing Organization Element |
| | Sales | Sales Organization Element |
| | Software | Software Department |
| | Legal | Legal Department |
| Associate Behavior | Element | Description |
| | Initiate Conversation | The associated may begin the conversation |
| | Silent until asked for | The associate may only interact when questioned |
| | Multiple Sales People | More than one associate is available |
| | Join with experts capability | Technical, negotiators, help desk, etc. |

FIG. 7

| SubSection Environment | | |
|---|---|---|
| Type | Element | Description |
| | Benefits | Organization's benefits package |
| | Sales Stream | Sales stream for products |
| | Project Plan | Project plans per project |
| | Marketing Plan | Marketing plan per project |
| | Software Tools | Products related to food |
| | Payroll | Payroll for employees |
| | Incentives | Incentive packages |
| | Office Space | Physical area of the organization |

FIG. 8

USER DEVICE INTERACTIONS DURING A SESSION OF A CO-BROWSING ENVIRONMENT

TECHNICAL FIELD OF THE APPLICATION

This application relates to user interactions among user devices participating in an active networking session and more particularly to user interactions which are conducted during a co-browsing session.

BACKGROUND OF THE APPLICATION

Conventional user access and network based collaboration on work related projects provide access, security updates and other features to the enterprise environment. One conventional application is offered by LIVELOOK as a provider of cloud-based, real-time visual collaboration with technology for co-browsing and screen sharing that optimizes customer interactions. For example, LIVELOOK's co-browsing technology enables customer service and sales agents to collaborate and visually guide consumers through web and mobile environments to resolve issues effectively and improve quality of buying decisions.

The ORACLE 'Service Cloud' and LIVELOOK empowers modern customer service organizations to directly engage with customers, bolstering customer satisfaction, agent efficiency, and revenue growth across web and mobile channels. The 'Service Cloud' is an integral part of the 'Customer Experience Cloud', which includes commerce, sales, service, social and marketing clouds, and enables a seamless and integrated customer experience. However, such approaches to customer support and integrated collaboration tools are limited in scope and do not offer a fully customized approach to user collaboration and engagement efforts.

In one specific example, collaboration and information access operations may include various web portals and browsers. Proxy servers are utilized in today's computing world for various reasons. They may cache content, perform web-filtering functionality, make the caller (originating browser) anonymous, etc. Proxy servers may also perform the job of a "reverse proxy". The term "reverse proxy" refers to the hiding of the identity of the server with which the originating caller is interacting. A reverse proxy is a type of proxy server that retrieves resources on behalf of a client from one or more servers. A reverse proxy acts as an intermediary for it associated servers and only returns resources provided by those associated servers.

Proxy servers are mostly utilized in today's computing environment to hide the identity of the clients routing traffic through the proxy server to hide the true identity of the caller bringing anonymity to the calling client/browser.

SUMMARY OF THE APPLICATION

One example embodiment may provide a method that includes at least one of receiving a browsing session notification indicating a user device has initiated an active session, identifying a request message from the user device to a service center, intercepting the request message, identifying the request message as requiring a co-browsing session, and forwarding the request message to a proctor device.

Another example embodiment may include an apparatus that includes a receiver configured to receive a browsing session notification indicating a user device has initiated an active session, and a processor configured to identify a request message from the user device to a service center, intercept the request message, identify the request message as requiring a co-browsing session, and a transmitter configured to forward the request message to a proctor device.

Yet another example embodiment may include a non-transitory computer readable storage medium configured to store instructions that when executed causes a processor to perform receiving a browsing session notification indicating a user device has initiated an active session, identifying a request message from the user device to a service center, intercepting the request message, identifying the request message as requiring a co-browsing session, and forwarding the request message to a proctor device.

A further example embodiment may include a method that includes receiving a browsing session notification from a user device, identifying a request message destined for another user device, intercepting the request message, identifying the request message as requesting a multi-user session, forwarding the request message to the another user device, identifying a group to assign to the user device and the another user device based on activity performed by the user device, and assigning the user device and the another user device to the group and creating the multi-user session.

Still yet another example embodiment may include an apparatus that includes a receiver configured to receive a browsing session notification from a user device, a processor configured to identify a request message destined for another user device, intercept the request message, identify the request message as requesting a multi-user session, identify a group to assign to the user device and the another user device based on activity performed by the user device, and assign the user device and the another user device to the group and creating the multi-user session, and a transmitter configured to forward the request message to the another user device.

Still yet a further example embodiment may include a non-transitory computer readable storage medium configured to store instructions that when executed causes a processor to perform receiving a browsing session notification from a user device, identifying a request message destined for another user device, intercepting the request message, identifying the request message as requesting a multi-user session, forwarding the request message to the another user device, identifying a group to assign to the user device and the another user device based on activity performed by the user device, and assigning the user device and the another user device to the group and creating the multi-user session.

BRIEF DESCRIPTION OF THE DRAWINGS

FIG. 3 illustrates a table of global environment parameters according to an example embodiment of the present application.

FIG. 4 illustrates a table of section environment parameters according to an example embodiment of the present application.

FIG. 5 illustrates a table of sub-section parameters according to an example embodiment of the present application.

FIG. 6 illustrates another table of global environment parameters according to an example embodiment of the present application.

FIG. 7 illustrates another table of section environment parameters according to an example embodiment of the present application.

FIG. 8 illustrates another table of sub-section environment parameters according to an example embodiment of the present application.

DETAILED DESCRIPTION OF THE APPLICATION

Figure 1:
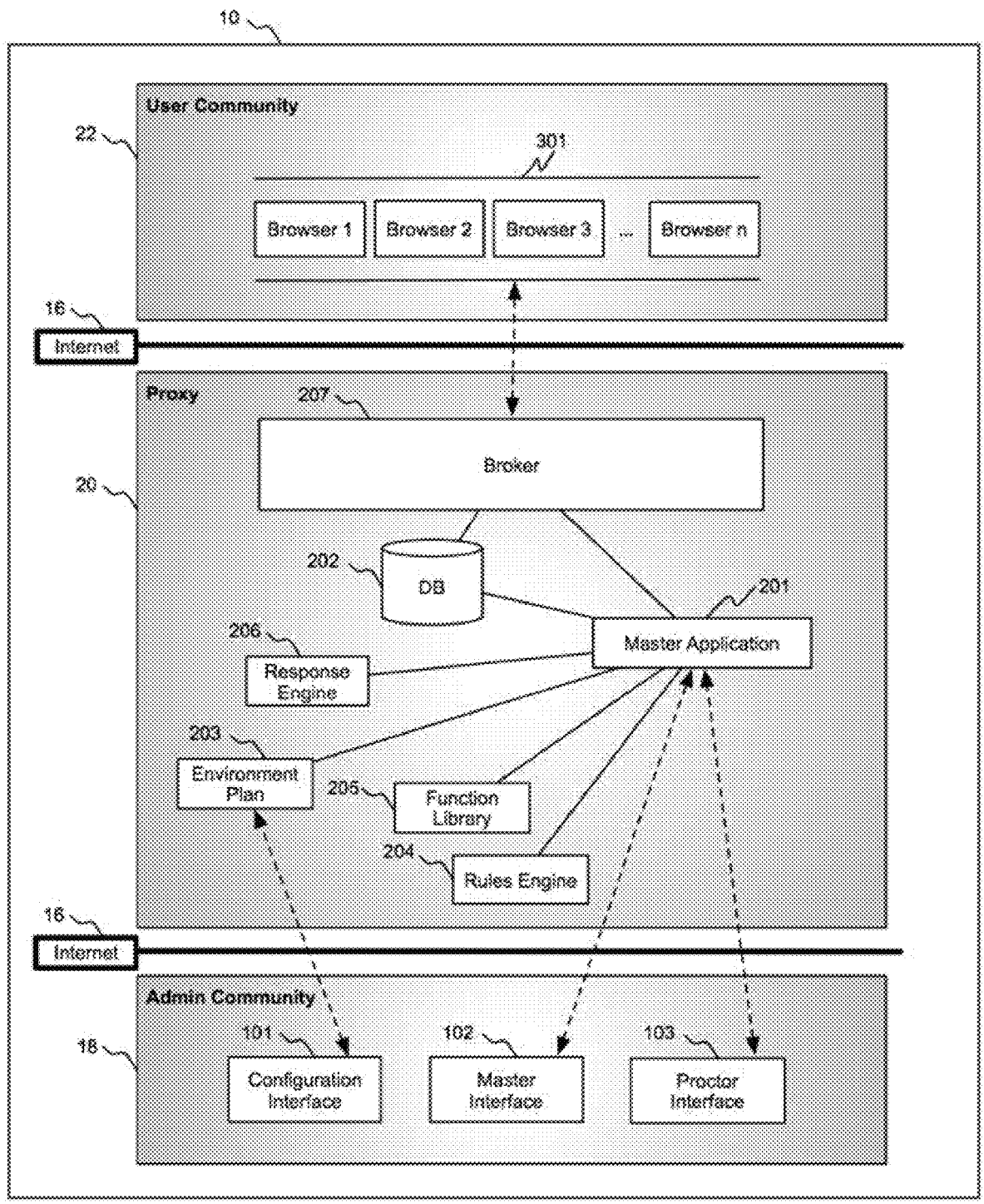
FIG. 1 illustrates a network logic diagram of the user community and administrative community communicating with the proxy device according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application provide the functionality of a co-browsing environment and specifically the grouping of users in a co-browsing environment. The foundation of this architecture is a master application which manages modules, functions and operations necessary to manage a proxy for a user and administrative community. The purpose of the master application is to provide the infrastructure for that application. This includes the foundation, the boundaries, the information flow, the power, the security, the communications, the flow of users, and the rules, limitations and capacities. The master application provides all of these basic and necessary structural elements. Without the master application, none of the functional interactions could take place. The user community devices may include a "client device" or user device utilizing any of a mobile client machine, a tablet computer, a laptop or desktop computer to download data and application data from a remote website server over the network. The client's device may also be a gaming device, a DVD player, or any other device that is normally used to access media.

FIG. 1 illustrates a system configuration 10 of the devices and applications operating in a combined system architecture according to example embodiments. Referring to FIG. 1, the user community 22 may include various user devices with enacted browsers 301, which communicate over the Internet to the proxy device 20. The admin community 18 may also communicate on the Internet via the various interfaces 101, 102 and 103 to the proxy 20. The master application 201 of the proxy 20 may be designed to support various environments efficiently and effectively. If the transfer of data through a search engine is required, the engine can be set up to support the needs of the search process and resulting data flow. Additionally, the search engine can also be configured for security, access, processing, or limitations of data flow. It can also manage power utilized by various applications, which may require more or less CPU time, memory and/or bandwidth.

According to one example, the personnel operating various user devices in a particular computing environment can also have established roles, purpose, constraints, etc., depending on the network configuration under which the user devices are operating. Supporting elements of the master application structure can include modules, engines, devices, logic instances, interfaces, etc., which permit the environment to be customized into a virtual infinity of custom environments. Those engines include but are not limited to a function library 205, a rules engine 204, a specific database implementation and design 202, a response engine 206, and environment plan 203 and a broker 207. The master application would be the central functional hub of each of those logical elements.

One embodiment of the interface includes calls and properties that would accumulate in a queue through messaging that is received. In this embodiment, the engines could reside on a different server or set of servers to scale the performance of the engine. The environment plan 203 is an engine that controls the master application configuration and operation. The environment plan module 203 may perform dynamic levels of activity and functional density profiles, the environmental plan can be set up in a similar manner as an electrical control system, adjusting the configuration parameters as various parameters change values. One example would be to reduce the number of users permitted to join an environment based on the level of activity of the CPU or the amount of RAM utilization. The factors may include a function of the function library activity profile 205, including a RAM use profile and historical function call profile. Based on those and other parameters described in this disclosure, other elements would be adjusted to maintain an optimum operational environment. The environment plan 203 would also manage static configuration parameters based on dynamic monitoring or on static configuration settings.

A configuration interface 101 is provided as a user interface to the environment plan via the admin community devices. The environment plan 203 may interrogate the master application 201 as well as the engines currently connected to the master application in a process that reports the various settings available for each engine as well as the master application. Once the configuration interface 101 has the available configuration information, the interface may create a user interface that permits a user to set configuration settings for other users. Once configured, the only portion left are the users and their interfaces. The admin devices operate the configuration interface 101 and control all operational aspects of the environment including user control.

The proctor is represented by a user device with the responsibility of overseeing specific functionality, areas, data, or sets of users. Various types of proctors can be established, including a presentation proctor, help proctors, sales proctors, security proctors, inventory/management proctors, marketing proctors, IT proctors and/or any other business or enterprise-related function/proctor. Each proctor would have specific designated roles, rules, and rights and would interface with the system proxy through the proctor interface 103. Proctors provide a user experience role that permits the end user device to have an enhanced communication experience.

In general, the broker 207 is in charge of processing the active and prospective connections to the user devices. All communication transmitted and received via the user devices 301 is through the broker 207. The broker is state-oriented and is kept abreast of the current state of each of the users, and is also the location where the cookies for each of the user browsers are actually stored. The Broker operates like a web server in that it serves content to the browsers. The broker derives its content to be delivered not just on user requests, but also the functions, rules, environment, and Master Application processing results. The Broker's main functionality is to maintain the state of the users in the system, therefore, this state is maintained by a Database 12; which is either directly connected to the Broker (as depicted), or may be remotely located wherein messaging between the Proxy Server and the Database is through the Network.

The Broker's responsibility is to handle the high level wherein the Master Application handles the lower level functionality. In other words, the Broker manages users in the environment (the connections to the users) and the Master Application manages the environment. As a summary, the broker's functionality includes, but is not limited to the following: Maintains the state of the users in the system, Manages the connections to the users in the system (i.e. login), Processes messages from the users and the Master Application, Serves pages to the user, Throttles connections, Prioritizes connections.

The environment of the application is a closed environment such that all users are required to log into the system before functionality is displayed. The functionality surrounding the establishment of the logging in and out, as well as the storing of the user-related information is not described herein as this technical functionality is common in applications. The environment is configured by a special user called the Administrator or otherwise referred to as the Admin. Interactions between the Admin and the system occur through the Configuration interface 101. This interface allows the different parts of the application to be created and initiated.

Figure 2A:
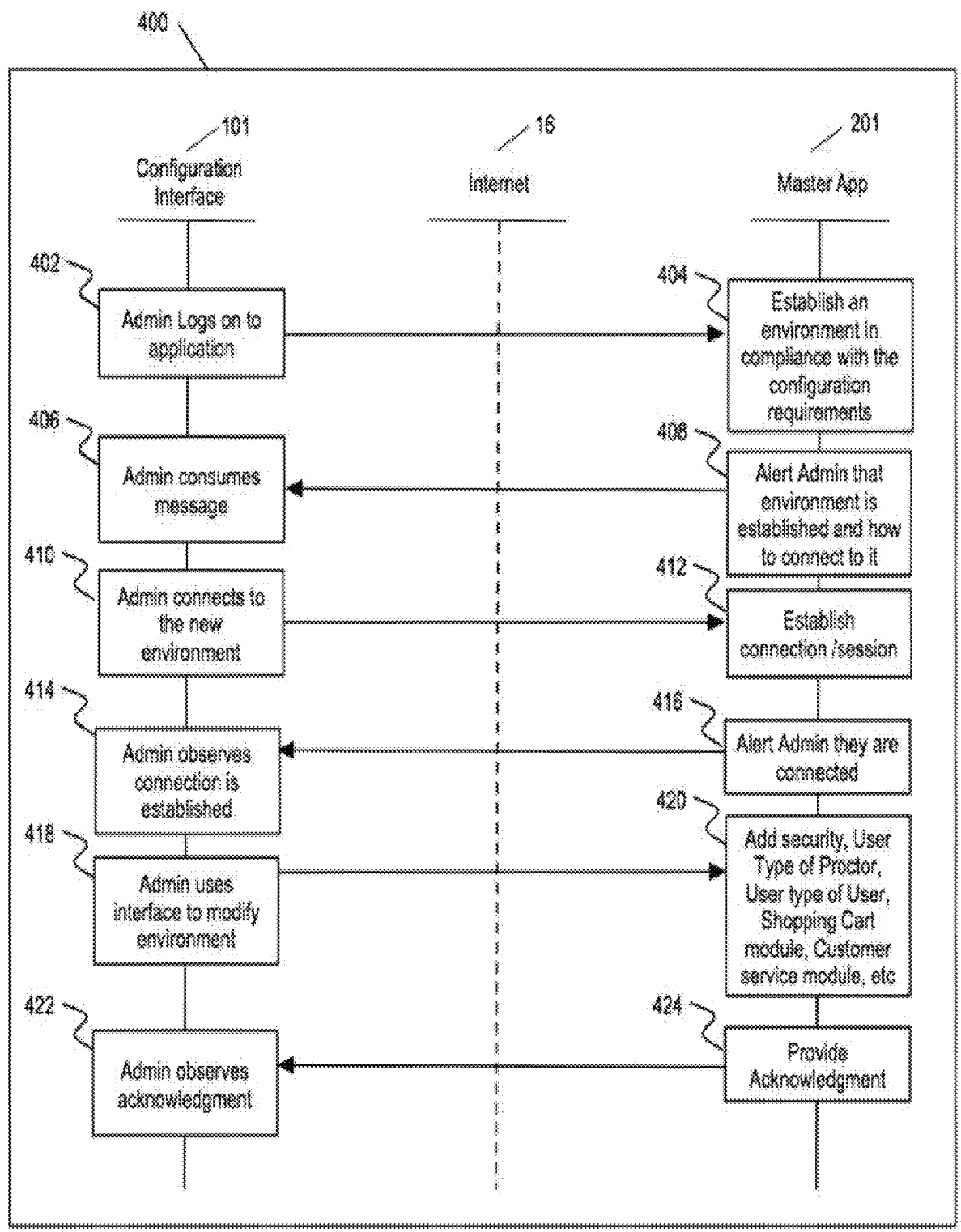
FIG. 2A illustrates a logic diagram of the administrative community configuration interface communicating with the master application of the proxy server operating to an example embodiment of the present application.

FIG. 2A is a system message flow configuration according to an example embodiment of the present application 400. Referring to FIG. 2A, the configuration provides the establishment of the environment by the admin user device(s). The depicted process may occur without some of the included operations which have been provided for example purposes. In operation, the admin functions provide credentials by logging into the system 402 via the configuration interface 101. This provides the admin to the application where any previously configured environments may be interacted. For this example, it is assumed that the admin is logging-in to initiate the configuration of an environment with no previously configured environment. In an alternate example, the current application may automatically log the administrator into the application 402 which is triggered by a particular event, such as the geographic proximity of the user to a device. For example, as the administrator approaches a physical location of the device with the application, location services on the device, for example, a mobile device carried by the administrator communicates with the application such that the application is aware that the administrator is near the device. As a result, the administrator is automatically logged into the application.

In another example, when the administrator device leaves the geographic location as noted through the use of location-based services, the application automatically logs-out the administrator. The admin, through the use of the GUI, selects the option to create a new environment, such as through the menu interface. A list of pre-configured environments is available. The environments may contain specifications of the environment's type, population density, sub-sections, behavior of users and categories.

Figure 2B:
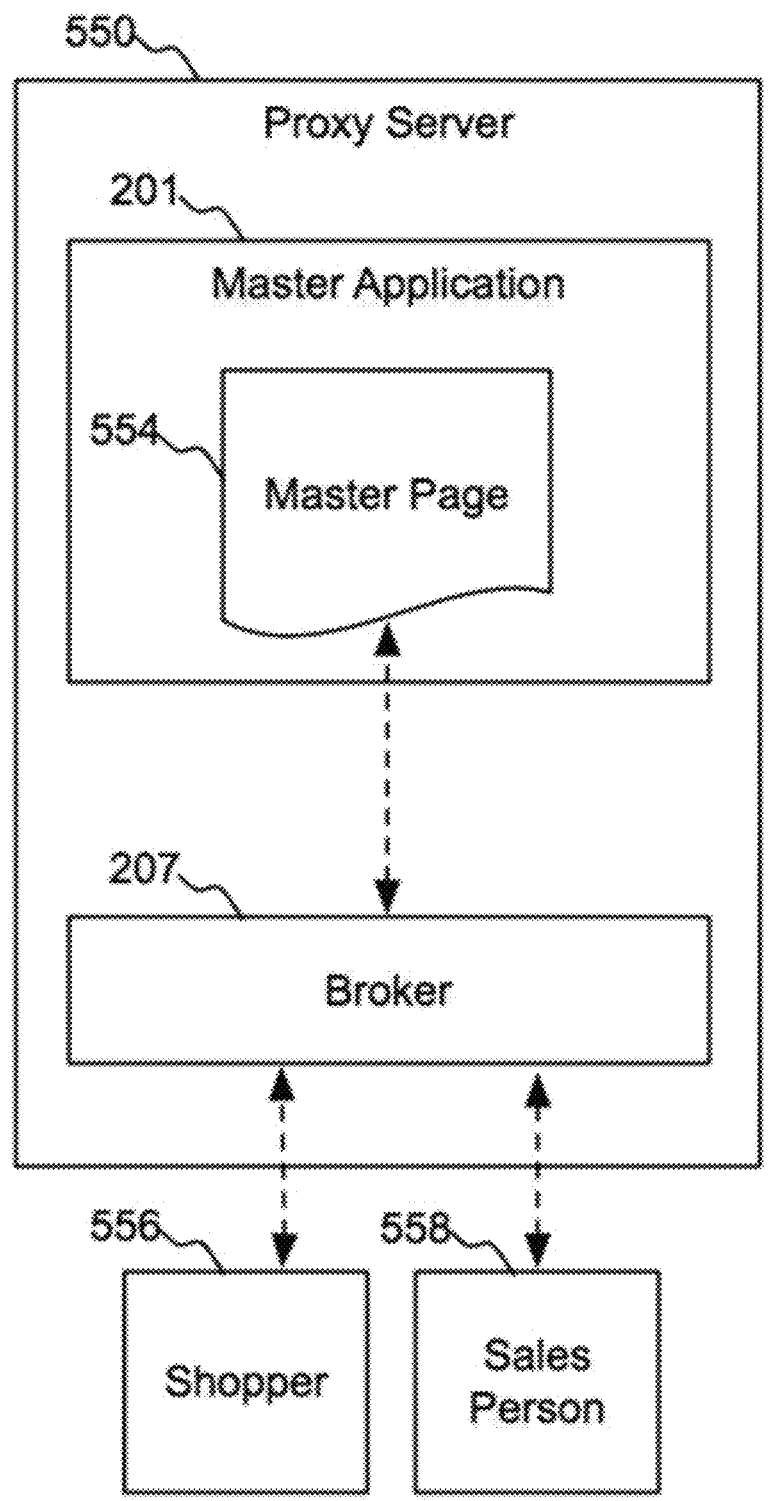
FIG. 2B illustrates a logic diagram of interaction with the proxy server, the user device and the proctor according to an example embodiment of the present application.

FIG. 2B illustrates a logic diagram of interaction with the proxy server, the user device and the proctor according to an example embodiment of the present application. Referring to FIG. 2B, this is one implementation of the current application demonstrating the interaction between the proctor, for example, the sales entity, the user device, for example, a shopper, and the proxy server. The proxy server 550 operates as the central point of functionality. It is through the proxy that connectivity with other user devices is performed. The reason for this is that browsers were intended to be thin clients. Browsers are not as 'thin' as they once were, but they are not feature rich when it comes to the functionality of the current application. As such, the proxy server becomes the hub of the functionality. The users' browsers, such as the shopper 556 and salesperson 558 may consume Hypertext Markup Language (HTML), and respond to JavaScript via their web browsers. The proxy includes a master application 201 and a broker 207. The master application is an architecture that is standardized, providing general functionality associated with a multiuser environment within a specific environment. It coordinates an existing state with broker requests and broker status reports regarding the user community. Based on the environment plan 203, it references the function library 205, rules engine 204, and response engine 206 to provide responses according to the environment plan.

The broker 207 is in charge of handling the connections to the users and all communication is performed through the broker. The broker is state-oriented and is kept abreast of the current state of each of the users. This is where the cookies (i.e., data elements of the user device) are actually stored.

The master application instructs the broker as to what the user(s) want to do and therefore sends messages to the broker. In a collaboration (or co-browsing) environment, the master application retains a master page 554. This master page contains the page that is the live version of the web page of the users individually, or the collaborative webpage of the users in the collaboration. It is a dynamic HTML/JavaScript generator that responds to outside stimulus. The master page is where this functionality occurs. In operation, when a user, for example a shopper, browses a webpage in the system, a master page 554 is established in the proxy server 550 for that user. The browser interfaces with the broker who handles the connection. The master application retains a master page containing the collaborative page that represents the live version of the web page of the user. It is a dynamic HTML/JavaScript generator that responds to outside stimulus. The master page is where this functionality occurs.

A sample of the environment data is illustrated in FIG. 3. Any of the tables of FIGS. 3-8 are sample environments in which the administrator will establish the environments through a menu interface. The tables represent possible implementations of the system in different environments. Referring to FIG. 3, the global environment 710 includes a type 713, element 712 and description 711. The example elements and descriptions include an indoor mall with a dual-sided storefront (hallway) and different layouts supported, such as a star, ladder, square, plus sign, etc. The next element is an outdoor mall with single sided storefronts and different layouts, such as a rectangle, line, and L-shape. The flea market or lattice has an outdoor feel. The department store is a rectangle, multi-floor with an indoor feel. The single store has an indoor feel. The dealership has a showroom (Indoor), a lot (Outdoor) or both, a new item section, and a used item section. A carnival has a festive outdoor feel. The population density 714 has an element of 'NNN' which sets the number of people/groups that will be simultaneously included in the session. The group behavior 715 has an element group size with a minimal and maximum size of groups, group behavior as to what the group may or may not do, and multiple group settings with how many groups can a user be in at one time. A group is established when a user (User A) desires to co-browse with another user in the system (User B). The group is not assigned, but is real-time in nature. The group does not particularly have users assigned to it, but (as in the example), a group is formed when a user desires another user to perform a function (i.e. co-browse).

FIG. 4 illustrates a section environment table 720 according to example embodiments. Referring to FIG. 4, the table includes a type 723, an element 722 and a description 721. For a type store, a description may include a typical store, a movie theater may include a theater type of business, an environment map may include a kiosk located in a mall environment for finding the store locations, a radio station may include a radio station type of business, a news outlet may include a news organization, an advertising space may include advertising, an open air store in a hall may include a store located in a mall type environment, a kiosk may include an advertising or POS element, a store special for audio may include specials pertaining to a particular store, store specials for a visual flyer/paper may include specials pertaining to a particular store, mall specials for audio may include specials pertaining to a group of stores, mall specials with visuals may include a flyer/paper with specials pertaining to a group of stores, breaking news may provide information elements pertaining to news and an auction house may include an organization pertaining to auctions. For The sales person behavior 725, the element may initiate conversation and the sales person may begin the conversation. Silent until asked for may provide a sales person may only interact when questioned, multiple sales people may include more than one sales person being available, and a join with experts' capability may provide a technical negotiators help desk, etc.

FIG. 5 illustrates a sub-section environment 730. Referring to FIG. 5, the example sections include a type 733, an element 732 and a description 731. The element book may include a book product, clothing may include men, women, boy, girl, infant, etc., sporting goods includes a sporting department, kids toys includes a kids toys department, food include products related to food, jewelry includes a jewelry department, musical instruments includes a musical department, accessories includes a division of a department.

FIG. 6 illustrates another table of a global environment 740. Referring to FIG. 6, the type 743, element 742 and description 741 may provide a global organization with a complete global organization, a country division may include an organization's location per country, a vendor may include vendors associated with the organization, products may include products output from the organization. Population density 744 may include an element 'NNN' with a description of setting a number of people/groups that will be simultaneously included in the session. The group behavior 745 may include an element with a group size having a minimal and maximum size of groups, group behavior of what the group may or may not do and multiple group settings of how many groups a user can be in at one time.

FIG. 7 illustrates a section environment table 750 according to example embodiments. Referring to FIG. 7, the type 753 and element 752 and description 751 may provide a HR element as a human resource organization element, a marketing element as a marketing organization element, a sales element as a sales organization element, a software element as a software department, and a legal element as a legal department. Also, an associate behavior 754 may include an element to initiate conversation with a description of an associate may begin the conversation, a silent until asked for element with an associate only interacting when questioned, multiple sales People for more than one available associate, join with experts' capability for technical, negotiators, help desk, etc.

FIG. 8 illustrates a table of a sub-section environment. Referring to FIG. 8, the table 760 includes a type 763, an element 762 and a description 761. The element may include benefits with a description of an organization's benefits package. The sales stream includes a sales stream for products, the project plan includes project plans per project, the marketing plan includes a marketing plan per project, software tools includes products related to food, payroll includes payroll for employees, incentives includes incentive packages, office space includes a physical area of the organization.

Referring again to FIG. 2, the master application 201 establishes a particular environment utilizing the requirements determined for the environment via the admin device 404. This establishes the environment where the new elements will reside including the response engine 206, rules engine 204, and the attributes of the broker 207, etc. For example, the environment can be sales, education, conference, etc., and each environment contains a basic set of configurations. In a sales environment, the main functionality is to process sales, and an education environment will contain no sales information, and a conference may have sales information, but sales would play a minor role. Once the environment is configured, the individual modules within the environment are configured. For example, multiple processes may be used to cycle the sales such that if one process gets overloaded or goes down then another process may overtake the processing in a round-robin fashion.

The master application 201 alerts the admin device that the environment is established and how to establish a connection 408 via a message that is sent to the configuration interface 101. The admin device receives, processes and consumes the message 406 and connects to the established environment 410. The master application initiates a session of the environment with the admin as the user 412. The master application alerts the admin 416 that the connection is established 414, and the admin, through the configuration interface can modify the environment 418. These modifications are sent to the master application and the elements of the environment are added 420. For example, the security aspects, the type of proctor, the shopping cart (if necessary), the customer service module (if necessary), and any other similar elements are added. A notification 424 is sent to the admin to acknowledge the environment is established 422.

Figure 9:
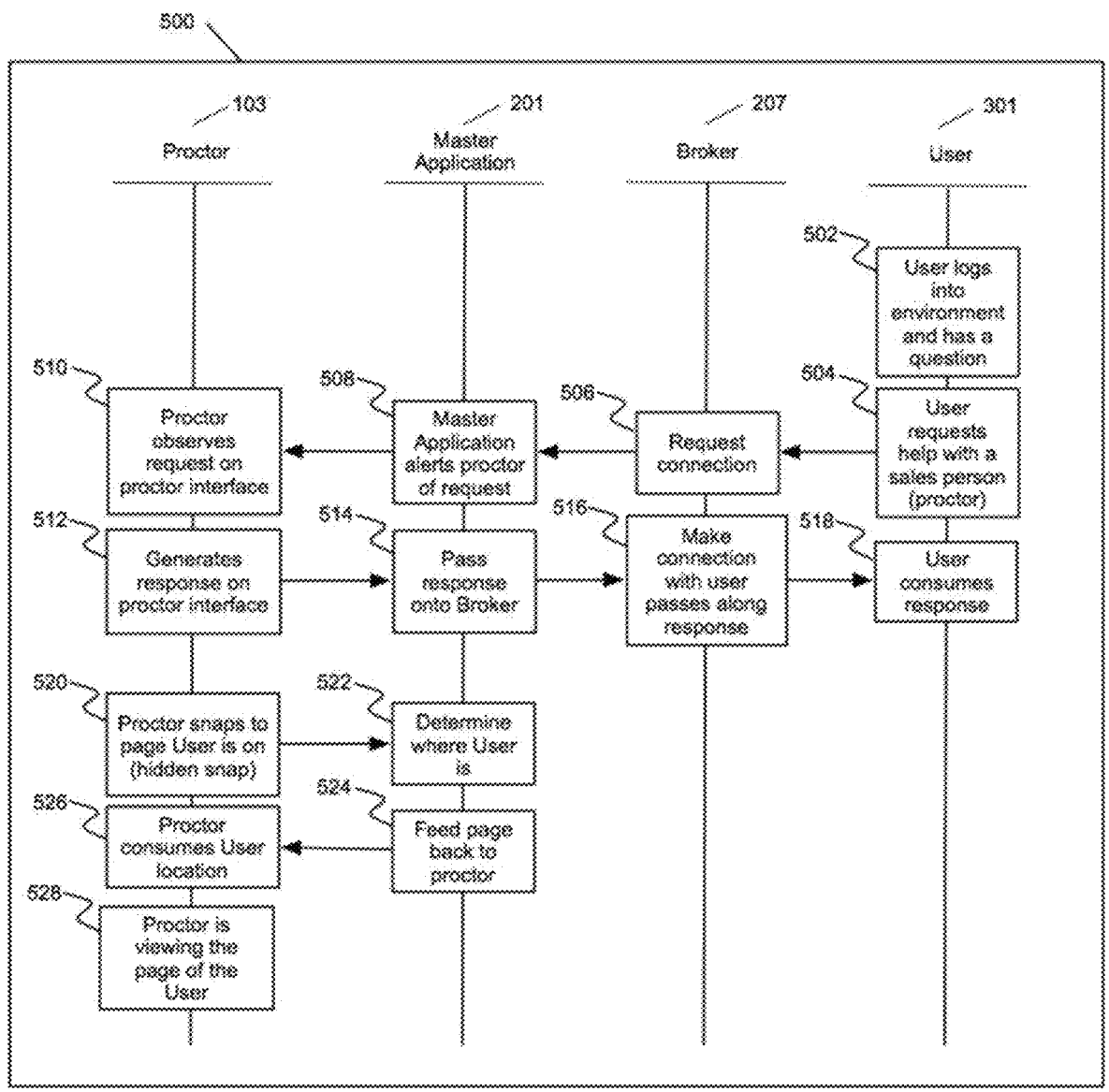
FIG. 9 illustrates a message flow of a system configuration of a broker managing a single user browsing session according to an example embodiment of the present application.

FIG. 9 illustrates a system configuration diagram according to an example embodiment of the current application depicting the process of a proctor establishing a connection with a user device 500. In this example of utilizing the proxy device and its corresponding attributes, the user device accesses the environment through a browser application operated on the user device and submits a question 502. The current application may automatically log-in the user device 502 when the logging in of the user device is triggered by a particular event, such as the geographic proximity of the user device. For example, as the user device nears another device operating the application, location services on the devices, for example, the mobile device on the user communicates with the application such that the software is aware that the user device is near the application device. In this case, the software automatically logs-in the user into the application so the user would not need to perform the log-in manually.

In another example, if the user leaves the geographic location as noted through the use of location-based services with the user's device on-person, the software automatically logs-out the administrator. Through the interface, for example, a "Help" button, or a menu item in the interface, the user requests help with a sales person, such as a proctor 504.

In an alternate example, the user may speak a question and the device converts the speech-to-text and through natural language processing (NLP), the application determines that a question has been received and then performs corresponding operations of FIG. 9. The speech from the user is received by a microphone on the user device 301. In another example, the user speaks a question and the software automatically logs the user into the application and processes the question. The request 506 is automatically submitted to the broker in a request for the connection. A message is sent to the proctor interface so the proctor or sales associate is able to view and respond. The message 506 is sent to the broker, forwarded to the master application 508 and finally delivered to the proctor interface for actual management and feedback. The proctor 103 is notified by the proctor interface, for example, through a notification, which may be audible and/or a software notification, that there is a request from a user 510. The proctor interacts with the proctor interface 103 to respond to the request, for example, by interacting with a GUI component on the proctor interface 512.

Continuing with the same example, the message is sent to the master application 201 and forwarded to the broker 514. The broker 207, managing the connections of the users in the system, establishes the connection 516 between the proctor and the user. A message is sent to the user to indicate that the proctor (sales associate) is connected with the user and the user may interact with the proctor 518. This interaction may include co-browsing, messaging audio and/or text, or any other interaction data where the proctor is able to respond to questions by the user. The proctor 103 is able to access and navigate the user's browser session through the co-browsing session and interact and assist the user. Additionally, the proctor is able to perform a hidden browser-forwarding operation where the user is unaware of the co-browsing session as it is established. This permits a proctor, for example, a sales associate, to monitor the navigation of the user once a certain level is reached. In this scenario, the proctor co-browses with the user and is able to view the navigation of the user's browser 520 assuming the user is on a secure site affiliated with the proctor.

The proctor 103 interacts with the proctor interface, for example by selecting a "Browse" button. Additionally, there is a list of users on the interface representing active users in the system and monitored by the application. The proctor 103 can select a user through the interface and choose to co-browse with that user manually as well in an automated pairing session.

In such a scenario, a message is sent to the master application 201 and the master application then determines the location of the user 522. This is accomplished by accessing the master page of the user. The master application retains a master page containing the collaborative page that represents the live version of the web page of the user. It is a dynamic HTML/JavaScript generator that responds to outside stimulus. The master page is where the functionality of the generator occurs. The user's browser location is sent back to the proctor 524 and is consumed 526 so the proctor can view the same webpage and navigation of the user in real-time 528.

In one example, a user may be operating within a particular application (i.e., ERP, Twitter, Human Resources, etc.). The user may be experiencing issues with some part of the application and something may not be operating as planned. For example, when initiating contact with an entity that can access the application, share a screen, and provide assistance via co-browsing.

In another example, a timer may operate in the system that is started upon initiation of a task (i.e., a browsing session on a particular web page). The timer may be set to a predetermined amount of time that the system determines is the proper time that the functionality should be completed. If the timer expires and the user is still operating the functionality, the system initiates a co-browsing session to aid the user. The co-browsing session may alternately provide the module/session that the user is currently operating within, as well as the functionality that the user was attempting to accomplish. The system application may be aware when the timer expires.

The system application may acknowledge the mouse/cursor is moving, mouse clicks, and/or keyboard clicks. The system has knowledge where the user is going (e.g., browsing, navigating through an application, etc.). For example, the user accesses YOUTUBE for help. The system is aware that the user is seeking help through reading the metadata of the YOUTUBE web page, or other methods. Based on those elements (one or more), a message automatically may appear in the user interface 'We think you are having trouble, would you like to initiate a co-browsing session", and/or here is a video with what we think you are trying to perform. If a video is playing at a particular location in the video (i.e. time section 2:55), then an automatic pop-in may be inserted with a user doing a co-browsing session.

Figure 10:
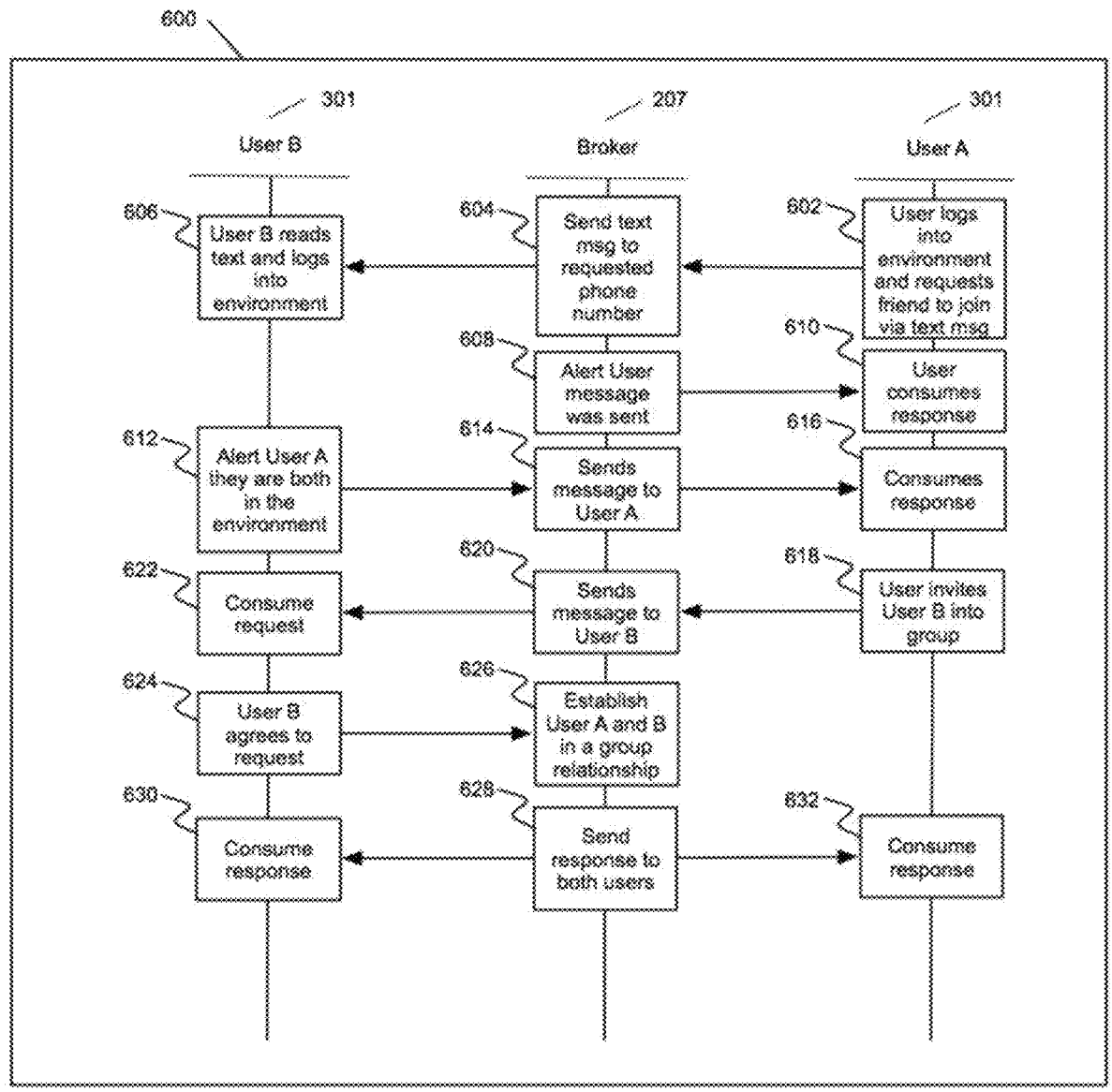
FIG. 10 illustrates a message flow of a system configuration of a broker managing a multiple user browsing session according to an example embodiment of the present application.

FIG. 10 is a functional flow of another embodiment of the current application. This example 600 depicts the connection of users in a group scenario. Referring to FIG. 10, user A 301 logs into the system 602 and sends a message, for example a text message, to another user, user B 301. The text message may be a request for user B to join user A in the browsing session. In another example, the data sent in the message contains indications that user A is utilizing the current application, and that the text message pertains to the application. Other forms of messaging may also be utilized, such as email, a SKYPE Internet call and/or message, a voice call, or any other commonly used form of communication.

Additionally, the user may verbally provide the request so the user speaks the text contents and the system automatically, through the receiving of the speech from the device's microphone, converts the speech to text and sends the text message to user B. The broker receives the message and forwards the message to the requested number 604. User B receives the text message from User A and logs into the environment 606. In another example, the application automatically logs user B into the environment upon the reception of the text message. The software examines the contents of the text message to determine that the incoming message pertains to the current application and proceeds to automatically log User B into the environment. The broker notifies user A that the notification has been sent to user B 608/610.

After successfully logging the users into the application, the application sends a notification that user B has joined the environment to the broker 207 and to user B 612/614/616. User A invites user B into the established or proposed group 618. The message is sent to the broker 620, which is then forwarded to the user 622. This may be a group that permits the two users to share information, a group that permits the sharing of data that is not commonly shared with other users in the system, or otherwise a group that permits for a determined functionality. For example, user A is joined into a group with User B as a result of the group invitation acceptance.

In one example, the environment is a shopping experience, since the two users have joined the group, financial data maybe shared between the users, as there is an elevate trust between the users of the group. User B may provide the payment for products placed in a shopping cart by user A, for example, without further authorization or access attempts. The sharing of specific and/or personal information is also made available due to the nature of the particular group. As another example, a developmental organization may have particular functionality that is permitted by the users in the group of the current application. Assuming, for instance, that users A and B are in a group and are also software engineers in a developmental organization, it may become readily apparent to assume that user B may provide software coding assistance for user A so the assistance may be viewed by those outside of the group. The group mentality permits for the sharing of data considered more personal in nature.

In FIG. 10 user B may agree to request to join the group 624. This may occur at a mobile device or any other device 301. The user interacts with the software of the application through a graphical user interface (GUI) on the device. A notification is received at the device 622 notifying the user that another user (User A) has requested the user to join a group. The user may interact with the GUI to respond to the request or ignore the request. If and when user B agrees to the request 624 through, for example, the GUI wherein a "Join" button is selected, a message is sent to the broker indicating the join has been performed. The broker 207 then as a result of receiving the message places the two users, user A and user B, in a group relationship 626 such that the functionality available to members in a group is made available. Notifications are sent to both users 628 indicating that each are now placed inside a group in the environment 630/632.

Figure 11:
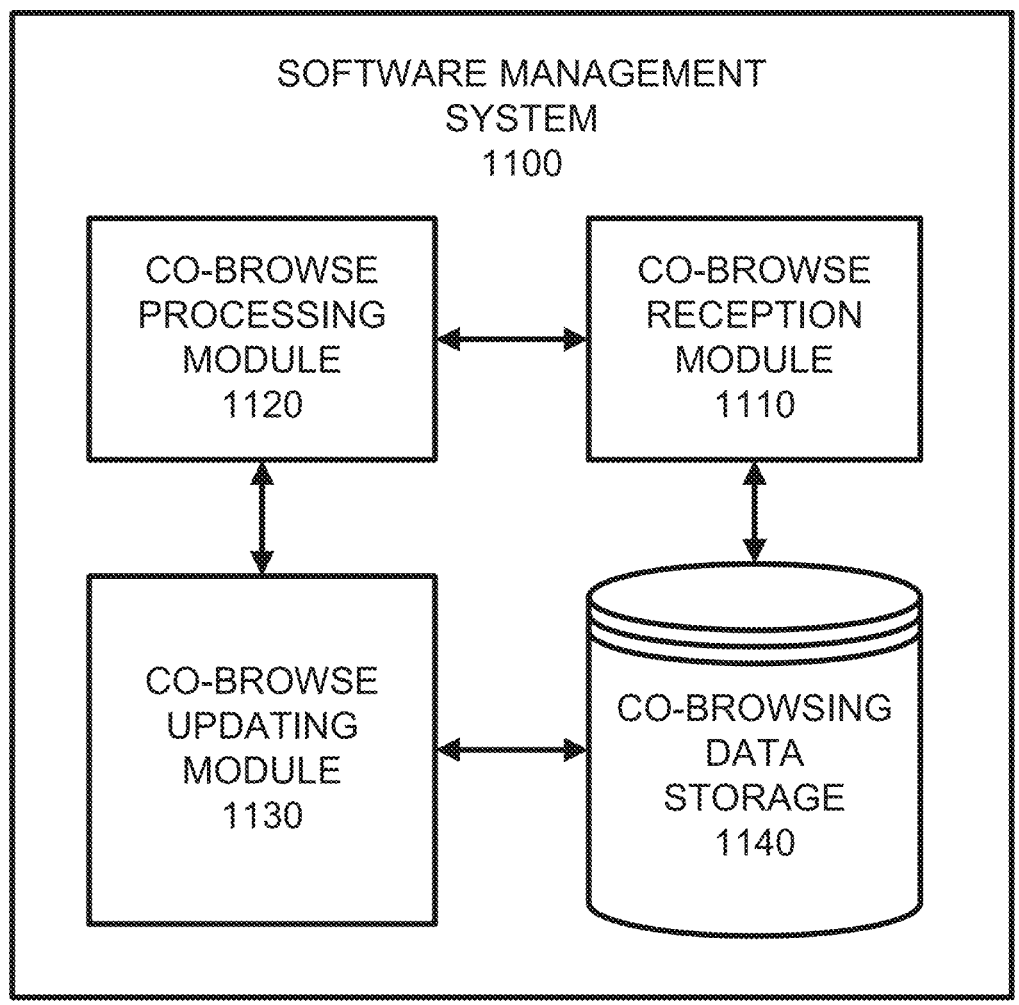
FIG. 11 illustrates a system configuration configured to perform one or more of the example embodiments of the present application.

FIG. 11 illustrates a co-browse management system 1100 according to example embodiments. Referring to FIG. 11, the system 1100 may represent a standalone computer, a group of computers on a network, in the cloud or in communication via any medium known to one skilled in the art which operate to perform the various operations, procedures, methods and related functions of the present application and the software application described throughout the disclosure. Referring to FIG. 11, the co-browse reception module 1110 may be a transmitter/receiver that receives requests, orders, messages, commands, etc., processes and stores the information in memory 1140 and forwards the data for processing 1120. The updated results may be identified and stored in memory via the co-browse update module 1130.

One example method of operation may include receiving a browsing session notification at reception module 1110 indicating a user device has initiated an active session, identifying a request message from the user device to a service center via the processing module 1120, intercepting the request message, identifying the request message as requiring a co-browsing session, and forwarding the request message to a proctor device via the update module 1130. The method may further provide creating a view of the active session at the proctor device, and providing shared access to browser content to the proctor device and the user device. The method may also include automatically creating the request message when the user device initiates a particular portion of the browser. The request message can include an indication of the particular portion of the browser.

The intercepting of the request message may also include identifying content of the request message via a broker function of a master application prior to forwarding the request message to the proctor device. The method may also include identifying the request message as requiring a co-browsing session includes monitoring user device activity on a browser and generating a request message based on the activity monitored. The method may also include identifying a location of the user device responsive to receiving the request message, and notifying the proctor device of the user device location.

Another example embodiment may provide a method that includes a multiuser browsing session managed by a broker during a browsing session. In this method, the examples may include receiving a browsing session notification from a user device at the reception module 1110, identifying a request message destined for another user device, intercepting the request message, identifying the request message as requesting a multi-user session via the processing module 1120, forwarding the request message to the another user device via the update module 1130, and identifying a group to assign to the user device and the another user device based on activity performed by the user device, and assigning the user device and the another user device to the group and creating the multi-user session, and storing the data in memory 1140.

The method may also include identifying the request message by identifying another user device telephone number. The activity performed by the user device can include a contextual definition. The parsing of the contextual definition from the activity of the user device may be based on content being browsed on a browser of the user device. Additionally, the method may also provide initiating a broker function of a proxy server responsive to the request message being identified, and notifying the another user device of the request message via the broker function. The method may further include assigning privileges to the user device and to the another user device based on predefined preferences of the user device. The predefined preferences can include at least one of equal privileges for all devices and limited privileges for guest devices.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 12 illustrates an example network element 1200, which may represent any of the above-described network components, etc.

Figure 12:
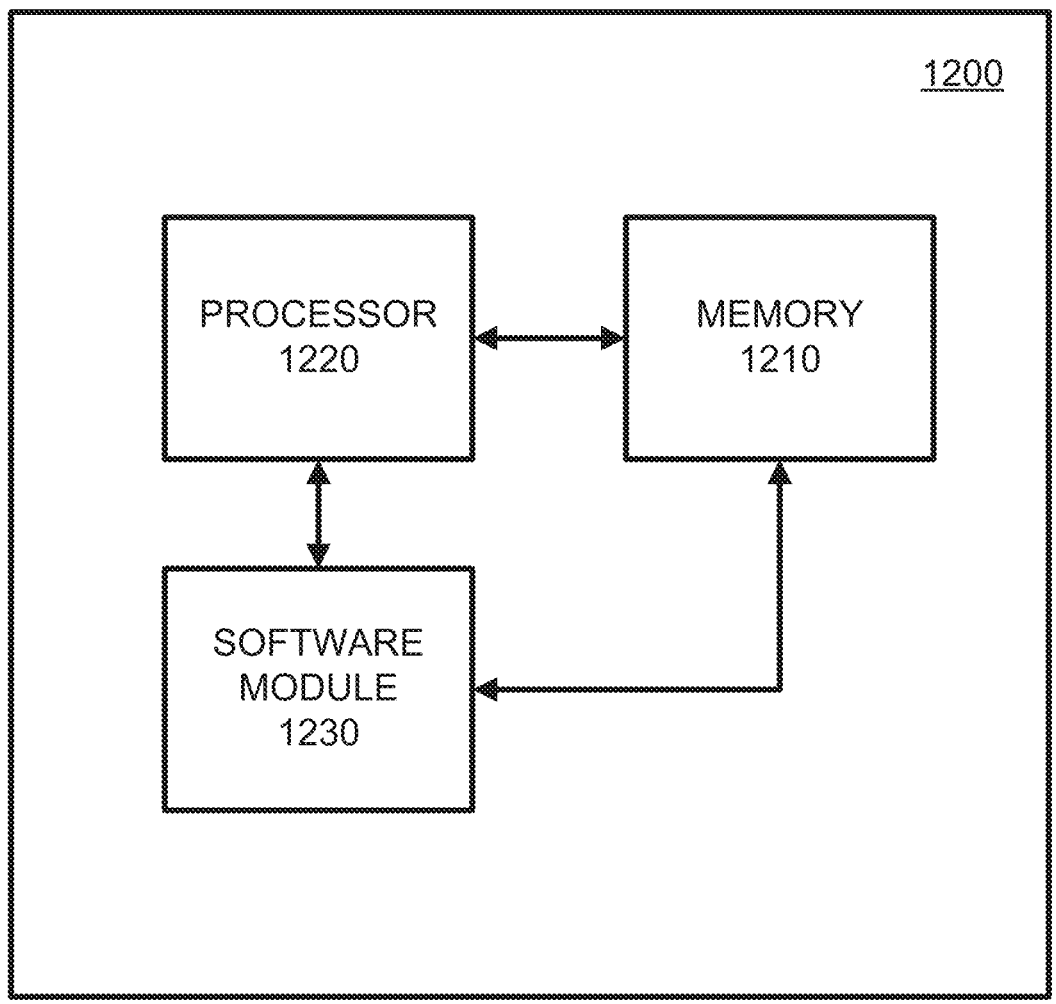
FIG. 12 illustrates an example network entity device configured to store instructions, software, and corresponding hardware for executing the same, according to example embodiments of the present application.

As illustrated in FIG. 12, a memory 1210 and a processor 1220 may be discrete components of the network entity 1200 that are used to execute an application or set of operations. The application may be coded in software in a computer language understood by the processor 1220, and stored in a computer readable medium, such as, the memory 1210. The computer readable medium may be a non-transitory computer readable medium that includes tangible hardware components in addition to software stored in memory. Furthermore, a software module 1230 may be another discrete entity that is part of the network entity 1200, and which contains software instructions that may be executed by the processor 1220. In addition to the above noted components of the network entity 1200, the network entity 1200 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 12 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a browsing session notification from a user device;
   identifying a request message destined for another user device as requesting a multi-user session;
   forwarding the request message to the another user device;
   identifying a group to assign to the user device and the another user device based on activity performed by the user device; and
   assigning the user device and the another user device to the group and creating the multi-user session.

2. The method of claim 1, wherein identifying the request message comprises identifying another user device telephone number.

3. The method of claim 2, wherein the activity performed by the user device comprises a contextual definition.

4. The method of claim 3, further comprising:
   parsing the contextual definition from the activity of the user device based on content being browsed on a browser of the user device.

5. The method of claim 4, further comprising:
   initiating a broker function of a proxy server responsive to the request message being identified; and
   notifying the another user device of the request message via the broker function.

6. The method of claim 5, further comprising:
   assigning privileges to the user device and to the another user device based on predefined preferences of the user device.

7. The method of claim 6, wherein the predefined preferences comprise at least one of equal privileges for all devices and limited privileges for guest devices.

8. An apparatus comprising:
   a receiver configured to receive a browsing session notification from a user device;
   a processor configured to
      identify a request message destined for another user device that requests a multi-user session,
      identify a group to assign to the user device and the another user device based on activity performed by the user device, and
      assign the user device and the another user device to the group and create the multi-user session; and
   a transmitter configured to forward the request message to the another user device.

9. The apparatus of claim 8, wherein the processor identifies the request message via the processor being configured to identify another user device telephone number.

10. The apparatus of claim 9, wherein the activity performed by the user device comprises a contextual definition.

11. The apparatus of claim 10, wherein the processor is further configured to
   parse the contextual definition from the activity of the user device based on content being browsed on a browser of the user device.

12. The apparatus of claim 11, wherein the processor is further configured to
   initiate a broker function of a proxy server responsive to the request message being identified, and
   notify the another user device of the request message via the broker function.

13. The apparatus of claim 12, wherein the processor is further configured to
   assign privileges to the user device and to the another user device based on predefined preferences of the user device.

14. The apparatus of claim 13, wherein the predefined preferences comprise at least one of equal privileges for all devices and limited privileges for guest devices.

15. A non-transitory computer readable storage medium configured to store instructions that when executed causes a processor to perform:
   receiving a browsing session notification from a user device;
   identifying a request message destined for another user device as requesting a multi-user session;
   forwarding the request message to the another user device;
   identifying a group to assign to the user device and the another user device based on activity performed by the user device; and
   assigning the user device and the another user device to the group and creating the multi-user session.

16. The non-transitory computer readable storage medium of claim 15, wherein identifying the request message comprises identifying another user device telephone number.

17. The non-transitory computer readable storage medium of claim 16, wherein the activity performed by the user device comprises a contextual definition.

18. The non-transitory computer readable storage medium of claim 17, wherein the processor is further configured to perform:
   parsing the contextual definition from the activity of the user device based on content being browsed on a browser of the user device.

19. The non-transitory computer readable storage medium of claim 18, wherein the processor is further configured to perform:
   initiating a broker function of a proxy server responsive to the request message being identified; and
   notifying the another user device of the request message via the broker function.

20. The non-transitory computer readable storage medium of claim 19, wherein the processor is further configured to perform:
   assigning privileges to the user device and to the another user device based on predefined preferences of the user device, and wherein the predefined preferences comprise at least one of equal privileges for all devices and limited privileges for guest devices.

* * * * *